Feb. 4, 1930.  A. KIRMSER  1,745,935
DISH COVER
Filed Feb. 13, 1929
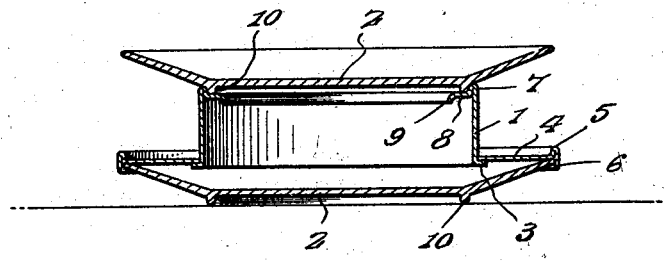
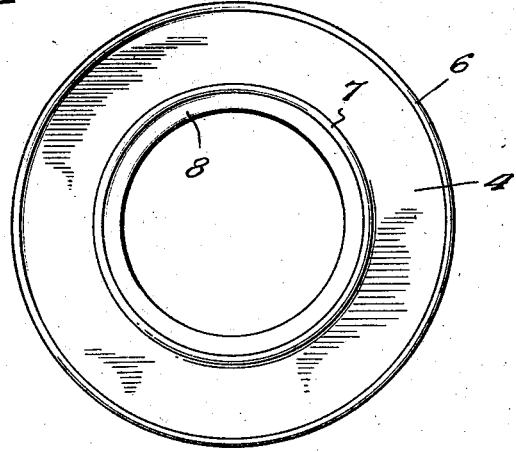
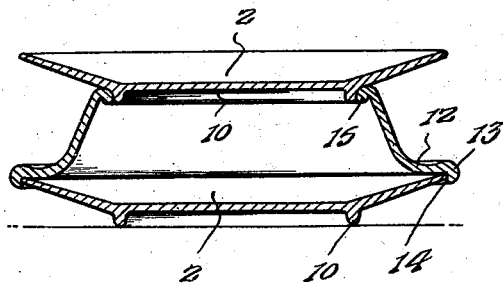 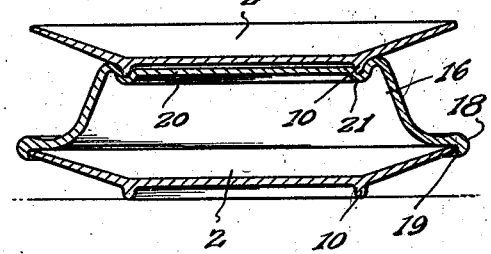
Inventor
A. Kirmser.
By Lacey & Lacey, Attorneys Patented Feb. 4, 1930

1,745,935

UNITED STATES PATENT OFFICE

AUGUST KIRMSER, OF CHICAGO, ILLINOIS

DISH COVER

Application filed February 13, 1929. Serial No. 339,627.

This invention relates to a device by means of which a dish having food thereon may be covered and in addition serve as a support for a second dish which in its turn serves as a closure for the upper end of the cover. When serving a number of persons at a banquet, the food is served in the kitchen and the plates brought to the table. A waiter can ordinarily only carry a few plates at a time and it sometimes happens that the food will not be as hot as it should be due to the fact that it cools before all of the plates may be placed upon the table.

Therefore, one object of the invention is to provide a device by the use of which food served upon plates may be kept warm and in addition a waiter allowed to carry a relatively large number of plates having food thereon without danger of dropping the plates.

Another object of the invention is to provide a device of this character which will be simple in its construction but at the same time strong and durable and also to so form the device that it may be easily cleaned.

The invention is illustrated in the accompanying drawing, wherein

Figure 1 is a sectional view showing one of the devices applied to a plate and a second plate resting upon the device in closing relation to its upper end, Fig. 2 is a bottom plan view of the improved dish cover, Fig. 3 is a view similar to Fig. 1 showing a modified form of the invention, and Fig. 4 is a similar view of another modified form of the invention.

The improved dish cover constituting the subject-matter of this invention includes an annular body or wall 1 formed of sheet metal and of such diameter that food placed upon a plate 2 may extend upwardly into the body without touching the walls thereof. At its lower end the walls of the body are formed with an outstanding annular flange 3 which extend beneath and are firmly secured to a base or ring 4 of such dimensions that it may rest upon the margins of a plate, as shown in Figure 1. The outer marginal portions of the base 4 are bent upwardly and then downwardly, as shown at 5, and project downwardly below the base ring in order to form a depending flange 6 adapted to fit about the dish or plate 2 and prevent any danger of the cover slipping transversely and sliding out of its proper position upon the dish when applied thereto. The upper portions of the walls 1 are folded downwardly, as shown at 7, and then bent to form an annular ledge 8 which extends about the walls 1 in slightly spaced relation to the upper end of the body and at its inner periphery terminates in a depending lip 9. The distance between the ledge 8 and the upper end of the body is approximately the same as the depth of the depending bead 10 formed upon a plate with which the device is to be used and the body is of such diameter that the bead may fit within the body and rest upon the ledge with the upper portion of the body encircling the bead and contacting with the under surface of the rim of the plate adjacent the bead. Therefore, after the cover has been applied to a plate, a second plate may be deposited upon the cover in closing relation to its open upper end where it will be well supported and prevented from moving transversely and slipping out of place. By use of this cover a number of dishes may be stacked one above another with covers between them and a waiter may carry a relatively large number of plates upon which food has been placed and the food will be kept warm while at the same time there will be no danger of the plates or covers slipping.

In Figure 3, there has been shown a modified form of dish cover. In this form of the invention the device is cast or otherwise formed as an integral structure. The body portion which is open at its top and bottom is provided with annular walls 11 which preferably flare downwardly and merge into an outwardly extending annular base 12, the outer margins of which are thickened, as shown at 13, and terminate in a depending flange 14 adapted to fit about the rim of a plate upon which the device is placed. This rim 14 takes the place of the depending rim 6 of the form shown in Figure 1 and prevents the device from sliding transversely out of its proper position upon the plate. At the upper end of the body the walls are turned inwardly, as shown at 15, thereby providing the seat or bead adapted to fit about the depending bead 10 of a plate disposed upon the body in covering relation to the open upper end thereof and not only provide a good support for the upper plate but also prevent this upper plate from sliding transversely out of its proper position upon the cover.

In Figure 4, the cover instead of being open at its upper end is closed so that food placed upon a plate may be kept warm even if another plate is not supported upon the cover. This cover is also formed as a casting, although it may be pressed from a metal blank and includes a body portion having annular walls 16 which flare downwardly and merge into an annular outstanding base 17 which corresponds to the base 12 and terminates in a thickened marginal portion 18 from which extends a depending flange 19 to fit about the rim of a plate upon which the cover is placed. At its top or upper end the body is closed by a head 20, the marginal portions of which form a gutter 21. This gutter merges into the inturned upper ends of the walls 16 and it should be noted that the walls extend upwardly above the head 20 so that if a second plate is placed upon the cover it may rest upon the inturned upper portions of the walls with its depending annular bead 10 fitting into the gutter. By this arrangement the upper plate will be well supported and prevented from slipping transversely out of its proper position upon the cover. The cover shown in Figure 4 is, therefore, so formed that it may be used merely as a cover for food served upon a plate and not immediately eaten or act as a support for another plate similarly covered and allow a number of plates to be carried in stacked formation.

Having thus described the invention, I claim:

1. A device of the character described comprising an annular base adapted to rest upon a plate and having its outer marginal portion bent upwardly and then downwardly to form a depending flange to engage about the margins of a plate, and an annular upstanding wall encircled by said base and having its lower portion bent to form an outstanding flange secured against the under face of the base, the upper portion of the wall being folded inwardly and then bent to form an internal annular ledge whereby a plate may rest upon the wall in covering relation to the upper end of the device with a depending annular bead of the plate encircled by the wall and resting upon said ledge.

2. A device of the character described comprising a body having an outstanding annular base adapted to rest upon a plate and support the body over the plate, the base having its marginal portion bent upwardly and then downwardly to form a depending flange to engage about the rim of the plate and prevent the device from having transverse movement upon the plate, said body having its upper portion formed with a portion constituting a seat for another plate to be supported upon the body and prevent transverse movement of the supported plate.

In testimony whereof I affix my signature.

AUGUST KIRMSER. [L. S.]